（12）United States Patent
Liu et al.

(10) Patent No.: US 11,485,171 B2
(45) Date of Patent: Nov. 1, 2022

(54) SPHERICAL/ELLIPTICAL SINGLE-WHEELED VEHICLE

(71) Applicant: Freeman IT Limited, Shenzhen (CN)

(72) Inventors: Haibo Liu, Shenzhen (CN); Feng Xie, Shenzhen (CN)

(73) Assignee: Freeman IT Limited, Shenzhen (CN)

( * ) Notice: Subject to any disclaimer, the term of this patent is extended or adjusted under 35 U.S.C. 154(b) by 337 days.

(21) Appl. No.: 16/652,630

(22) PCT Filed: Oct. 10, 2018

(86) PCT No.: PCT/CN2018/109556
§ 371 (c)(1),
(2) Date: May 20, 2020

(87) PCT Pub. No.: WO2019/114389
PCT Pub. Date: Jun. 20, 2019

(65) Prior Publication Data
US 2020/0282767 A1    Sep. 10, 2020

(30) Foreign Application Priority Data

Dec. 12, 2017  (CN) .......................... 201711320359.7
Jun. 22, 2018  (CN) .......................... 201810648762.0

(51) Int. Cl.
*B60B 19/14*     (2006.01)
*B62K 11/00*     (2006.01)
(Continued)

(52) U.S. Cl.
CPC .............. *B60B 19/14* (2013.01); *B60B 19/12* (2013.01); *B62J 50/10* (2020.02); *B62K 11/007* (2016.11);
(Continued)

(58) Field of Classification Search
CPC .......... B60B 19/14; B60B 19/12; B60B 9/12; B60B 9/14; B62J 50/10; B62J 25/04;
(Continued)

(56) References Cited

U.S. PATENT DOCUMENTS 9,085,334 B2 * 7/2015 Hoffmann ............... B60L 50/52
10,786,726 B2 * 9/2020 Doerksen ............... A63C 17/12
(Continued)

FOREIGN PATENT DOCUMENTS

| CN | 201890317 U | 7/2011 |
| CN | 202271776 U | 6/2012 |

(Continued)

OTHER PUBLICATIONS

International Search Report dated Feb. 27, 2019, issued by the National Intellectual Property Administration in corresponding application PCT/CN2018/109556.
(Continued)

*Primary Examiner* — Kevin Hurley
*Assistant Examiner* — Marlon A Arce
(74) *Attorney, Agent, or Firm* — Stein IP, LLC

(57) ABSTRACT

A spherical/elliptical single-wheeled vehicle comprises a motor, pedals and a wheel. The motor comprises a motor shell and a spindle having two ends fixedly connected to the pedals respectively. The wheel is spherical or elliptical and is of a hollow structure having two ends formed with openings, and the wheel is arranged on the motor housing in a sleeving manner, is fixedly connected to the motor housing, and comprises a sleeve made from an elastic material. The wheel has a large contact area with the ground at any angles, thus the controllability of the single-wheeled vehicle is greatly improved; in addition, users can get on the vehicle easily, and the operation difficulty of the single-wheeled vehicle is lowered, and user experience is improved; and the (Continued)

reinforcing shells are used to support the two ends of the spherical/elliptical wheel, so that the structural stability of the spherical/elliptical single-wheeled vehicle is improved.

9 Claims, 3 Drawing Sheets

(51) Int. Cl.
  *B60B 19/12* (2006.01)
  *B62J 50/10* (2020.01)
(52) U.S. Cl.
  CPC ...... *B62K 2202/00* (2013.01); *B62K 2204/00* (2013.01)
(58) Field of Classification Search
  CPC .............. B62K 11/007; B62K 2202/00; B62K 2204/00; B62K 1/00; B60Y 2200/81; B60Y 2200/91
  See application file for complete search history.

(56) References Cited

U.S. PATENT DOCUMENTS

| | | | | |
|---|---|---|---|---|
| 11,136,084 | B2* | 10/2021 | Shang | B62J 6/015 |
| 11,299,059 | B1* | 4/2022 | De La Rua | B60L 53/16 |
| 2002/0058891 | A1* | 5/2002 | Hood, Jr. | A61H 1/003 |
| | | | | 601/26 |
| 2005/0241864 | A1* | 11/2005 | Hiramatsu | A63C 17/004 |
| | | | | 180/181 |
| 2011/0191013 | A1* | 8/2011 | Leeser | H02K 7/116 |
| | | | | 180/10 |
| 2013/0257138 | A1* | 10/2013 | Chang | B60B 19/12 |
| | | | | 301/5.23 |
| 2016/0318337 | A1* | 11/2016 | Clerc | B62D 61/06 |
| 2018/0022197 | A1* | 1/2018 | Bewley | B60B 19/14 |
| | | | | 180/21 |
| 2018/0099525 | A1* | 4/2018 | Kim | A63B 43/04 |

FOREIGN PATENT DOCUMENTS

| | | |
|---|---|---|
| CN | 203876934 U | 10/2014 |
| CN | 104309746 A | 1/2015 |
| CN | 204161569 U | 2/2015 |
| CN | 205622390 U | 10/2016 |
| CN | 205769813 U | 12/2016 |
| CN | 107089098 A | 8/2017 |
| CN | 107137908 A | 9/2017 |
| CN | 107444557 A | 12/2017 |
| CN | 107512349 A | 12/2017 |
| CN | 107867359 A | 4/2018 |
| CN | 208216429 U | 12/2018 |
| EP | 2 409 905 A1 | 7/2010 |
| GB | 1598691 A | 9/1981 |

OTHER PUBLICATIONS

Chinese Office Action dated Jun. 17, 2019, issued by the Chinese Patent Office in corresponding application CN 201810648762.0.
Extended European Search Report dated Mar. 22, 2021, issued by the European Patent Office in corresponding application EP 18888005.8.
Canadian Office Action dated May 14, 2021, issued by the Canadian Patent Office in corresponding application CA 3,078,265.

* cited by examiner

SPHERICAL/ELLIPTICAL SINGLE-WHEELED VEHICLE

CROSS-REFERENCE TO RELATED APPLICATIONS

This application is a national stage of International Application No. PCT/CN2018/109556, filed Oct. 10, 2018, which claims the benefit of Chinese Application No. 201810648762.0, filed Jun. 33, 2018, and Chinese Application No. 201711320359.7, filed Dec. 12, 2017 in the China National Intellectual Property Administration, the disclosures of which are incorporated herein by reference.

TECHNICAL FIELD

The invention relates to single-wheeled vehicles, in particular to a spherical/elliptical single-wheeled vehicle.

DESCRIPTION OF RELATED ART

The wheel of existing single-wheeled vehicles is round like bicycle wheels. Because the single-wheeled vehicles have only one round wheel, only users who have good physical balance can smoothly control the single-wheeled vehicles, and it is difficult for users with poor physical balance to use the single-wheeled vehicles. In addition, because of the small contact area between the wheel of the existing single-wheeled vehicles and the ground, the single-wheeled vehicles may occasionally lose power when inclining forwards or backwards due to the decrease of the frictional force with the ground, operators may fall, and the controllability of the single-wheeled vehicles is reduced.

Therefore, it is necessary to provide a spherical/elliptical single-wheeled vehicle which is easy to control.

BRIEF SUMMARY OF THE INVENTION

The technical issue to be settled by the invention is to provide a spherical/elliptical single-wheeled vehicle.

The technical solution adopted by the invention to settle the above technical issue is as follows: a spherical/elliptical single-wheeled vehicle comprises a motor, pedals and a wheel, wherein the motor comprises a motor housing and a spindle having two ends fixedly connected to the pedals respectively, the wheel is spherical or elliptical and is of a hollow structure having two ends formed with openings, and the wheel is arranged on the motor housing in a sleeving manner, is fixedly connected to the motor housing and comprises a sleeve made from an elastic material.

The invention has the following beneficial effects: the spherical (or elliptical) wheel made from an elastic material has a large contact area with the ground at all angles and thus can provide power for buffering even if the single-wheeled vehicle falls in the moving process, so that injuries to users caused by a sudden stop are avoided, and the controllability of the single-wheeled vehicle is greatly improved; and in addition, the users can get on the vehicle easily, even users with poor physical coordination can smoothly operate the spherical (or elliptical) single-wheeled vehicle, the operation difficulty of the single-wheeled vehicle is reduced, and user experience is improved.

REFERENCE SIGNS 1, motor housing; 2, spindle; 3, pedal; 31, shield plate; 32, anti-slip strip; 33, handle hole; 4, wheel; 41, sleeve; 42, lining; 43, limit groove; 5, first convex strip; 6, groove; 7, reinforcing shell; 71, limit ring; 8, second convex strip; 9, bearing.

DETAILED DESCRIPTION OF THE INVENTION

The technical contents, objectives and effects of the invention are expounded below in combination with the embodiments and accompanying drawings.

The key concept of the invention lies in that a spherical or elliptical wheel is directly connected to a motor housing.

Figure 1:
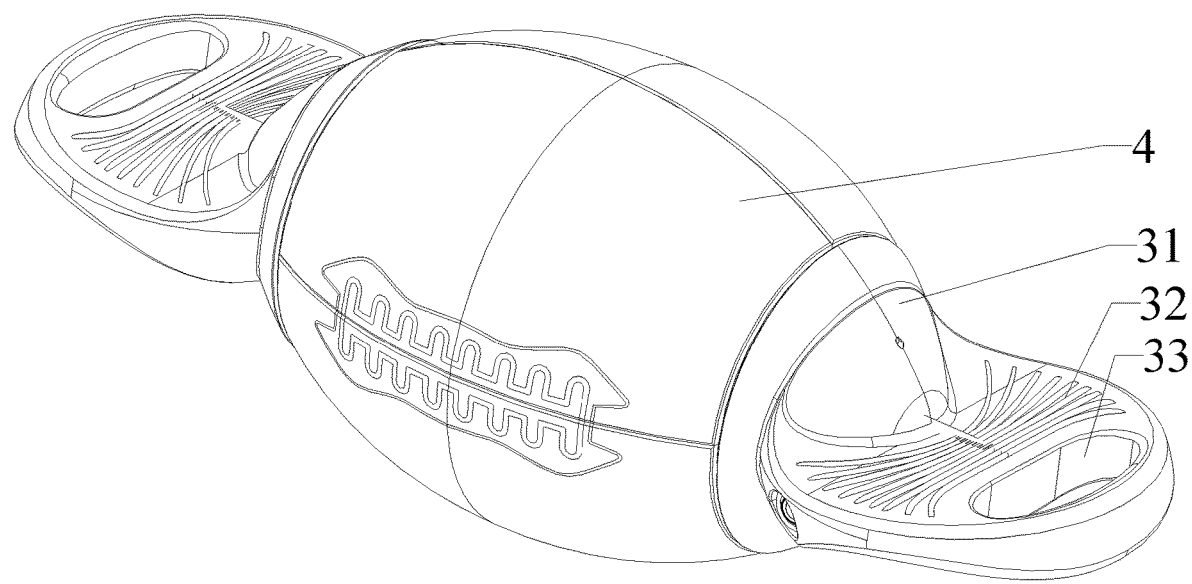
FIG. 1 is an overall structural diagram of a spherical/elliptical single-wheeled vehicle in Embodiment 1 of the invention.
Figure 2:
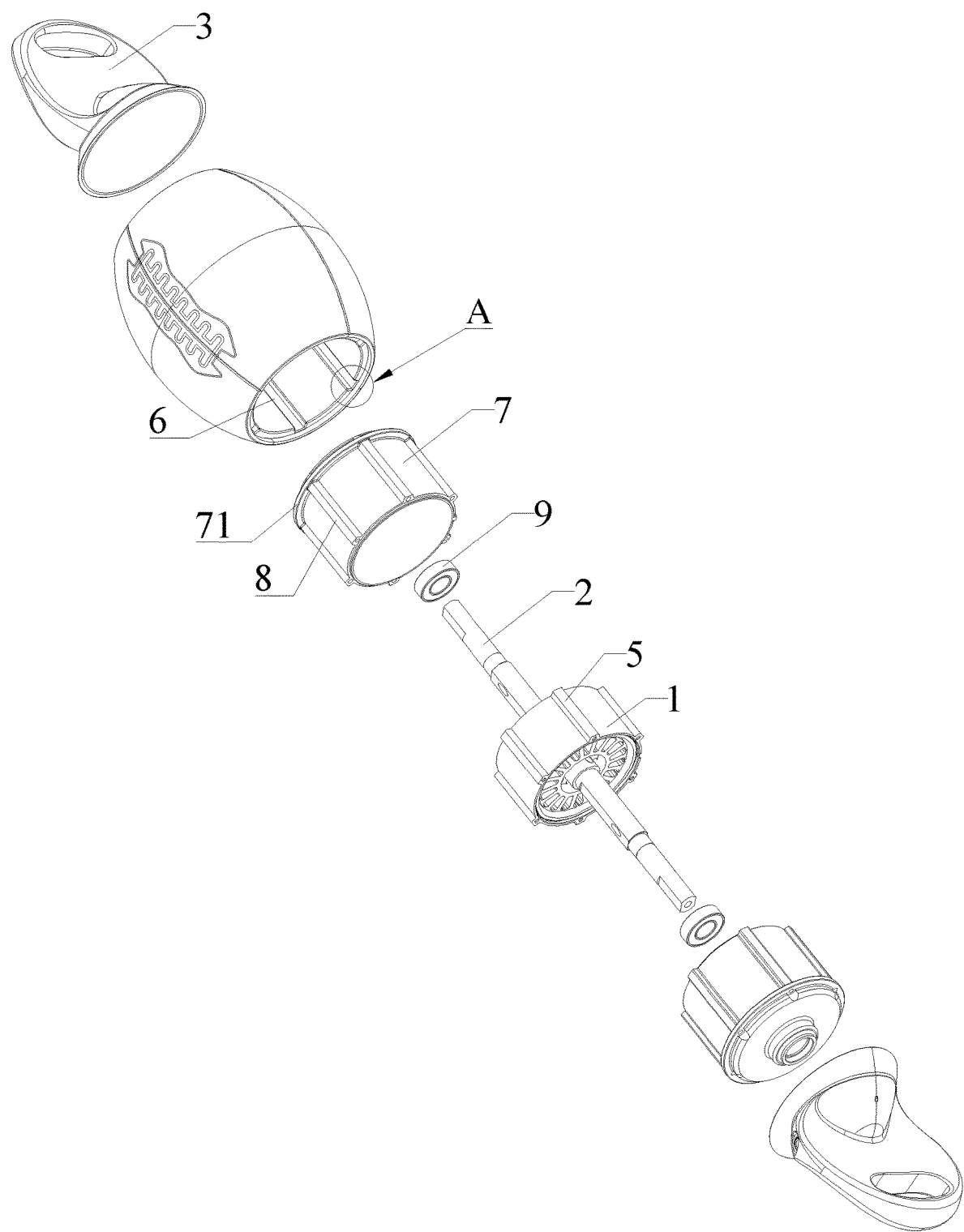
FIG. 2 is an exploded view of the spherical/elliptical single-wheeled vehicle in Embodiment 1 of the invention.
Figure 3:
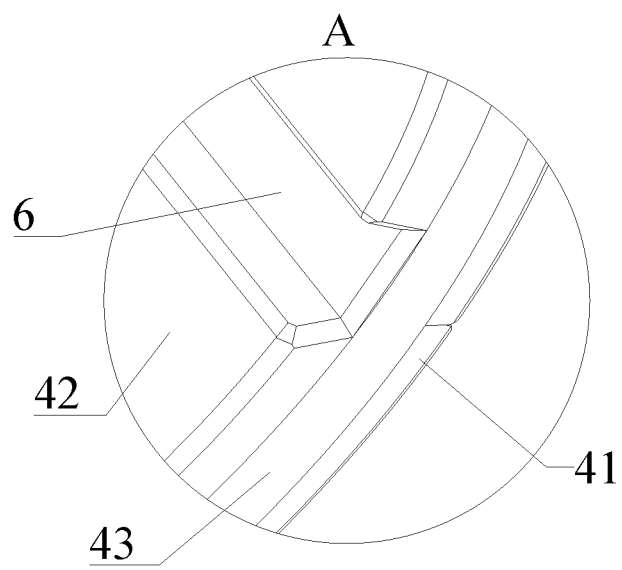
FIG. 3 is an enlarged view of part A in FIG. 2.

Referring to FIG. 1 to FIG. 3, a spherical/elliptical single-wheeled vehicle comprises a motor, pedals 3 and a wheel 4, wherein the motor comprises a motor housing 1 and a spindle 2 having two ends fixedly connected to the pedals 3 respectively, the wheel 4 is spherical or elliptical and is of a hollow structure having two ends formed with openings, and the wheel 4 is arranged on the motor housing 1 in a sleeving manner, is fixedly connected to the motor housing 1 and comprises a sleeve 41 made from an elastic material.

From the above description, the invention has the following beneficial effects: the spherical (or elliptical) wheel made from an elastic material has a large contact area with the ground at all angles and can provide power for buffering even if the single-wheeled vehicle falls in the moving process, so that injuries to users caused by a sudden stop are avoided, and the controllability of the single-wheeled vehicle is greatly improved; and in addition, the users can get on the vehicle easily, even users with poor physical coordination can smoothly operate the spherical (or elliptical) single-wheeled vehicle, the operation difficulty of the single-wheeled vehicle is reduced, and user experience is improved.

Furthermore, first convex strips 5 are arranged on the outer circumferential wall of the motor housing 1 in an axial direction, and grooves 6 matched with the first convex strips 5 are formed in the inner circumferential wall of the wheel 4.

From the above description, the wheel and the motor housing are connected easily and reliably. The multiple first convex strips are uniformly arranged on the outer circumferential wall of the motor housing.

Furthermore, the wheel 4 further comprises a lining 42, the sleeve 41 is arranged outside the lining 42 in a sleeving manner and is fixedly connected to the lining 42, and the grooves 6 are formed in the inner circumferential wall of the lining 42.

From the above description, the lining is made from a high-strength material such as aluminum alloy or carbon fibers. Preferably, the lining is a cylinder of a hollow structure having two ends formed with openings. The lining can prevent the wheel and the motor housing from slipping.

Furthermore, the spherical/elliptical single-wheeled vehicle further comprises reinforcing shells 7 having an outer diameter equal to that of the motor housing 1, wherein the reinforcing shells 7 are rotatably arranged around the spindle 2 and are fixedly connected to the motor housing 1, and second convex strips 8 are arranged on the outer circumferential walls of the reinforcing shells 7 in an axial direction of the spindle 2 and are matched with the grooves 6.

Furthermore, the number of the reinforcing shells 7 is two, and the motor housing 1 is located between the two reinforcing shells 7.

From the above description, the reinforcing shells are used to support the two ends of the spherical (or elliptical) wheel, so that the structural stability of the spherical (or elliptical) single-wheeled vehicle is improved.

Furthermore, each reinforcing shell 7 is a cylinder of a hollow structure having an end formed with an opening, a through hole is formed in the bottom of each cylinder, bearings 9 are arranged around the spindle 2 and are located in the through holes, and the openings of the cylinders face the motor.

From the above description, functional parts (such as the PCB and a power supply) of the single-wheeled vehicle can be arranged in cavities of the reinforcing shells.

Furthermore, a limit ring 71 which extend outwards is arranged at the bottom of each cylinder in a radial direction of the cylinder, and limit grooves 43 matched with the limit rings 71 are formed in the openings of the wheel 4.

From the above description, the limit rings arranged on the reinforcing shells can limit the position of the wheel, so that deviation of the wheel is avoided. The wheel is located between the two limit rings respectively arranged on the two reinforcing shells.

Furthermore, each pedal 3 comprises a conical shield plate 31, and the ends, close to the wheel 4, of the shield plates 4 have a diameter equal to that of the openings of the wheel 4.

From the above description, the conical shield plates make the single-wheeled vehicle more attractive and prevent dust from entering the motor via the openings at the two ends of the wheel, so that the operating stability of the single-wheeled vehicle is guaranteed.

Furthermore, the pedals 3 are provided with anti-slip strips 32.

From the above description, the anti-slip strips have an anti-slip function.

Furthermore, handle holes 33 are formed in the pedals 3.

From the above description, users can carry the single-wheeled vehicle outdoors conveniently by means of the handle holes in the pedals.

Embodiment 1

Referring to FIG. 1 to FIG. 3, in Embodiment 1 of the invention, a spherical/elliptical single-wheeled vehicle comprises a motor, pedals 3 and a wheel 4, as shown in FIG. 1 and FIG. 2, wherein the motor comprises a motor housing 1 and a spindle 2 having two ends fixedly connected to the pedals 3 respectively, the wheel 4 is spherical or elliptical and is of a hollow structure having two ends formed with openings, and the wheel 4 is arranged on the motor housing 1 in a sleeving manner, is fixedly connected to the motor housing 1, and comprises a sleeve 41 made from an elastic material. In this embodiment, the sleeve 41 is made from rubber.

As shown in FIG. 2, first convex strips 5 are arranged on the outer circumferential wall of the motor housing 1 in an axial direction, and grooves 6 matched with the first convex strips 5 are formed in the inner circumferential wall of the wheel 4.

Preferably, as shown in FIG. 2 and FIG. 3, the wheel 4 further comprises a hard lining 42 which is of a hollow structure having two ends formed with openings, the sleeve 41 is arranged outside the lining 42 in a sleeving manner and is fixedly connected to the lining 42, and the grooves 6 are formed in the inner circumferential wall of the lining 42.

In order to improve the structural stability of the single-wheeled vehicle, the spherical (or elliptical) single-wheeled vehicle further comprises reinforcing shells 7 having an outer diameter equal to that of the motor housing 1, the reinforcing shells 7 are rotatably arranged around the spindle 2 and are fixedly connected to the motor housing 1, and second convex strips 8 are arranged on the outer circumferential walls of the reinforcing shells 7 in an axial direction of the spindle 2 and are matched with the grooves 6, that is, the second convex strips 8 are in one-to-one correspondence with the first strips 5.

In this embodiment, number of the reinforcing shells 7 is two, and the motor housing 1 is located between the two reinforcing shells 7.

Particularly, each reinforcing shell 7 is a cylinder which is of a hollow structure having an end formed with an opening, a through hole is formed in the bottom of each cylinder, bearings 9 are arranged around the spindle 2 and are located in the through holes, and the openings of the cylinders face the motor. More particularly, inner rings of the bearings 9 are fixed to the spindle 2, and outer rings of the bearings 9 are fixed in the through holes.

Furthermore, as shown in FIG. 2 and FIG. 3, a limit ring 71 which extends outwards is arranged at the bottom of each cylinder in a radial direction of the cylinder, and limit grooves 43 matched with the limit rings 71 are formed in the openings of the wheel 4. In this embodiment, the limit grooves 43 are formed in the lining 42.

Preferably, each pedal 3 comprises a conical shield plate 31, and the ends, close to the wheel 4, of the shield plates 31 have a diameter equal to that of the openings of the wheel 4 so as to shield the openings of the wheel 4.

The pedals 3 are provided with anti-slip strips 32 which are ridges or pits, and handle holes 33 are formed in the pedals 3.

According to the spherical/elliptical single-wheeled vehicle of the invention, the wheel has a large contact area with the ground at all angles and thus can provide power for buffering even if the single-wheeled vehicle falls in the moving process, so that injuries to users caused by a sudden stop are avoided, and the controllability of the single-wheeled vehicle is greatly improved; in addition, the users can get on the vehicle easily, even users with poor physical coordination can smoothly operate the spherical (or elliptical) single-wheeled vehicle, the operation difficulty of the single-wheeled vehicle is lowered, and user experience is improved; the reinforcing shells can support the two ends of the spherical or elliptical wheel, so that the structural stability of the spherical (or elliptical) single-wheeled vehicle is improved; the limit rings are arranged on the reinforcing shells to limit the position of the wheel, so that deviation of the wheel is avoided; and the conical shield plates make the single-wheeled vehicle more attractive and prevent dust from entering the motor via the openings in the two ends of the wheel, so that the working stability of the single-wheeled vehicle is guaranteed.

The above embodiments are only illustrative ones of the invention, and are not intended to limit the patent scope of the invention. All equivalent transformations achieved on the basis of the contents in the specification and the drawings, or direct or indirect applications to relating technical fields should also fall within the protection scope of the invention.

The invention claimed is:

1. A spherical/elliptical single-wheeled vehicle, comprising a motor, pedals and a wheel, the motor comprising a motor housing and a spindle, wherein two ends of the spindle are fixedly connected to the pedals, respectively, the wheel is spherical or elliptical and is of a hollow structure having two ends formed with openings, and the wheel is arranged on the motor housing in a sleeving manner, is fixedly connected to the motor housing, and comprises a sleeve made from an elastic material, wherein first convex strips are arranged on an outer circumferential wall of the motor housing in an axial direction, and grooves matched with the first convex strips are formed in inner circumferential wall of the wheel.

2. The spherical/elliptical single-wheeled vehicle according to claim 1, wherein the wheel further comprises a lining, the sleeve is arranged outside the lining in a sleeving manner and is fixedly connected to the lining, and the grooves are formed in an inner circumferential wall of the lining.

3. The spherical/elliptical single-wheeled vehicle according to claim 1, wherein the spherical/elliptical single-wheeled vehicle further comprises reinforcing shells having an outer diameter equal to that of the motor housing, the reinforcing shells are rotatably arranged around the spindle and are fixedly connected to the motor housing, and second convex strips are arranged on outer circumferential walls of the reinforcing shells in an axial direction and are matched with the grooves.

4. The spherical/elliptical single-wheeled vehicle according to claim 3, wherein the number of the reinforcing shells is two, and the motor housing is located between the two reinforcing shells.

5. The spherical/elliptical single-wheeled vehicle according to claim 3, wherein each said reinforcing shell is a cylinder which is of a hollow structure having an end formed with an opening, through holes are formed in bottoms of the cylinders, bearings are arranged around the spindle and are located in the through holes, and the openings of the cylinders face the motor.

6. The spherical/elliptical single-wheeled vehicle according to claim 5, wherein limit rings which extend outwards in a radial direction of the cylinders are arranged at the bottoms of the cylinders, and limit grooves matched with the limit rings are formed in openings of the wheel.

7. The spherical/elliptical single-wheeled vehicle according to claim 1, wherein the pedals are provided with anti-slip strips.

8. The spherical/elliptical single-wheeled vehicle according to claim 1, wherein handle holes are formed in the pedals.

9. A spherical/elliptical single-wheeled vehicle, comprising a motor, pedals and a wheel, the motor comprising a motor housing and a spindle, wherein two ends of the spindle are fixedly connected to the pedals respectively, the wheel is spherical or elliptical and is of a hollow structure having two ends formed with openings, and the wheel is arranged on the motor housing in a sleeving manner, is fixedly connected to the motor housing, and comprises a sleeve made from an elastic material, wherein each said pedal comprises a conical shield plate, and ends, close to the wheel, of the shield plates have a diameter equal to that of the openings of the wheel.

* * * * *